United States Patent
Tippet et al.

(10) Patent No.: US 9,505,906 B1
(45) Date of Patent: *Nov. 29, 2016

(54) POLYMER FOAMS

(71) Applicant: FINA TECHNOLOGY, INC., Houston, TX (US)

(72) Inventors: Jon Tippet, League City, TX (US); John Ashbaugh, Houston, TX (US); Fengkui Li, Houston, TX (US); Douglas Burmaster, Houston, TX (US); Jeffrey E. Nairn, League City, TX (US); Marc Mayhall, Houston, TX (US); Leland Daniels, Dayton, TX (US)

(73) Assignee: Fina Technology, Inc., Houston, TX (US)

( * ) Notice: Subject to any disclaimer, the term of this patent is extended or adjusted under 35 U.S.C. 154(b) by 1 day.

This patent is subject to a terminal disclaimer.

(21) Appl. No.: 14/601,399

(22) Filed: Jan. 21, 2015

Related U.S. Application Data

(63) Continuation-in-part of application No. 14/268,826, filed on May 2, 2014.

(60) Provisional application No. 62/005,613, filed on May 30, 2014.

(51) Int. Cl.
| | |
|---|---|
| *C08K 5/14* | (2006.01) |
| *C08K 5/098* | (2006.01) |
| *C08L 23/12* | (2006.01) |
| *C08J 9/00* | (2006.01) |

(52) U.S. Cl.
CPC .............. *C08K 5/098* (2013.01); *C08J 9/0052* (2013.01); *C08K 5/14* (2013.01); *C08L 23/12* (2013.01)

(58) Field of Classification Search
CPC ............ C08J 9/00; C08K 5/14; C08K 5/098; C08L 23/12; A01B 12/006
See application file for complete search history.

(56) References Cited

U.S. PATENT DOCUMENTS

| | | | |
|---|---|---|---|
| 4,001,172 A | 1/1977 | Steinkamp et al. | |
| 4,454,256 A * | 6/1984 | Pellicelli | C08J 9/0061 264/54 |
| 6,326,409 B1 * | 12/2001 | Mihayashi | C08J 9/0061 521/134 |
| 2005/0123744 A1 | 6/2005 | Mohanty et al. | |
| 2006/0135699 A1 | 6/2006 | Li et al. | |
| 2006/0293424 A1 | 12/2006 | Tse et al. | |
| 2008/0076844 A1 | 3/2008 | Van Sumeren et al. | |
| 2009/0197983 A1 | 8/2009 | Vo et al. | |
| 2010/0056727 A1 | 3/2010 | Lipishan et al. | |
| 2012/0164425 A1 | 6/2012 | Ruckdaeschel et al. | |
| 2013/0096000 A1 | 4/2013 | Tian et al. | |
| 2013/0266806 A1 | 10/2013 | Nagano et al. | |

FOREIGN PATENT DOCUMENTS

| | | |
|---|---|---|
| WO | 2007002177 A1 | 1/2007 |
| WO | 2012/174568 A2 | 12/2012 |

OTHER PUBLICATIONS

International Search Report and Written Opinion issued in PCT/US2015/028724, dated Jul. 24, 2015, 8 pages.

* cited by examiner

*Primary Examiner* — Irina S Zemel
(74) *Attorney, Agent, or Firm* — Albert Shung

(57) ABSTRACT

A polymer composition may include polyolefin having a molecular weight distribution of greater than or equal to 8 as measured by GPC and a metallic acrylate salt. The polymer composition may be characterized by one or more of: a melt flow rate of from 0.1 g/10 min to 10 g/10 min; a melt flow viscosity between 2,000 Pa·s and 6,000 Pa·s; a die swell of between 2 and 8; and a die swell characteristic time of between 0.3 seconds and 1.2 seconds. The polymer composition may be in the form of foam. A process of forming foam may include supplying polymer composition including metallic acrylate salt and polyolefin resin, and mixing the polymer composition with foaming agent. A foam may include a polymer composition that includes polyolefin and polar polymer and does not include an ionomer. The foam may have a foam density of less than 0.25 g/cc.

23 Claims, No Drawings

POLYMER FOAMS

CROSS-REFERENCE TO RELATED APPLICATIONS

This application is a Non-Provisional of U.S. Provisional Application No. 62/005,613, filed on May 30, 2014, and is a Continuation-in-part of U.S. patent application Ser. No. 14/268,826, filed on May 2, 2014.

FIELD

Embodiments of the present disclosure generally relate to foams made from polymers.

BACKGROUND

Polymers may be used for various foamed applications, particularly for applications requiring lightweight energy management or cushioning. Examples include automotive components, packaging, dunnage, thermal insulation, and safety applications where repeated impact may occur.

SUMMARY

An embodiment of the present disclosure includes a polymer composition. The polymer composition includes a polyolefin having a molecular weight distribution of greater than or equal to 8 as measured by Gel Permeation Chromatography (GPC) and a metallic acrylate salt. The polymer composition is characterized by one or more of the following properties: a melt flow rate of from 0.1 g/10 min to 10 g/10 min as measured by ASTM D-1238; a melt flow viscosity between 2,000 Pa·s and 6,000 Pa·s as measured by ASTM D-1238; a die swell of between 2 and 8 as measured by ASTM D-3835; and a die swell characteristic time of between 0.3 seconds and 1.2 seconds.

Yet another embodiment of the present disclosure is directed to a foam. The foam includes a polymer composition including a polyolefin and a polar polymer. The polar polymer is between 0.001% and 3% of the polymer composition by weight. The polymer composition does not include an ionomer. The foam has a foam density of less than 0.25 g/cc.

Another embodiment of the present disclosure includes a process. The process includes supplying a polymer composition which includes a polyolefin resin having a molecular weight distribution of greater than or equal to 8 as measured by GPC and a metallic acrylate salt. The process further includes mixing the polymer composition and foaming agent to form a polymer foam. The polymer composition is characterized by one or more of the following properties: a melt flow rate of from 0.1 g/10 min to 10 g/10 min as measured by ASTM D-1238; a melt flow viscosity between 2,000 Pa·s and 6,000 Pa·s as measured by ASTM D-1238; a die swell of between 2 and 8 as measured by ASTM D-3835; and a die swell characteristic time of between 0.3 seconds and 1.2 seconds.

DETAILED DESCRIPTION

Introduction and Definitions

A detailed description will now be provided. The description includes specific embodiments, versions, and examples, but the disclosure is not limited to these embodiments, versions, or examples, which are included to enable a person having ordinary skill in the art to make and use the disclosure when that information is combined with available information and technology.

Various terms as used herein are shown below. To the extent a term used in a claim is not defined below, it should be given the broadest definition skilled persons in the pertinent art have given that term as reflected in printed publications and issued patents at the time of filing. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

Polymers

Polymers useful in this disclosure include styrenic polymers and polyolefins. Examples of polyolefins include, but are not limited to, polyethylene, polypropylene, polyolefin elastomers, and combinations thereof. Polyolefin elastomers, include, but are not limited to polyisoprene, polybutadiene, chloroprene, butyl rubber, styrene butadiene, nitrile rubber, ethylene propylene rubber, epichlorohydrin rubber, polyacrylic rubber, silicone rubber, fluorosilicone rubber, fluoroelastomers, perfluoroelastomers, polyether block amides, chlorosulfonated polyethylene, and ethylene-vinyl acetate. Other non-limiting examples of polyolefins useful in the present disclosure include linear low density polyethylene, plastomers, high density polyethylenes, low density polyethylenes, medium density polyethylenes, polypropylene and polypropylene copolymers, for example. The polymer may also include functionalized versions of the above, for instance maleated polypropylene.

Examples of styrenic polymers include homopolymers of styrene, alpha-methyl styrene, vinyl toluene, p-methyl styrene, t-butyl styrene, o-chlorostyrene, vinyl pyridine, and any combinations thereof. Styrenic polymers may contain one or more comonomers. Non-limiting examples of such comonomers include α-methylstyrene; halogenated styrenes; alkylated styrenes; acrylonitrile; esters of methacrylic acid with alcohols having 1 to 8 carbons; N-vinyl compounds such as vinylcarbazole and maleic anhydride; compounds which contain two polymerizable double bonds such as for example and without limitation divinylbenzene or butanediol diacrylate; or combinations thereof. The styrenic polymer may include a thermoplastic material. Examples of thermoplastic materials include without limitation acrylonitrile butadiene styrene, celluloid, cellulose acetate, ethylene vinyl acetate, ethylene vinyl alcohol, fluoroplastics, ionomers, polyacetal, polyacrylates, polyacrylonitrile, polyamide, polyamide-imide, polyaryletherketone, polybutadiene, polybutylene, polybutylene terephthalate, polychlorotrifluoroethylene, polyethylene terephthalate, polycyclohexylene dimethylene terephthalate, polycarbonate, polyetherimide, polyethersulfone, polyethylenechlorinate, polyimide, polylactic acid, polymethylpentene, polyphenylene oxide, polyphenylene sulfide, polyphthalamide, polypropylene, polysulfone, polyvinyl chloride, polyvinylidene chloride, and combinations thereof. The styrenic polymer may include an elastomeric phase that is embedded in a polymer matrix. The elastomeric phase may include a conjugated diene monomer such as 1,3-butadiene, 2-methyl-1,3-butadiene, and 2-chloro-1,3-butadiene, or an aliphatic conjugated diene monomer such as $C_4$ to $C_9$ dienes such as butadiene monomers.

In one or more embodiments, the polyolefin is a propylene based polymer. As used herein, the term "propylene based" is used interchangeably with the terms "propylene polymer" or "polypropylene" and refers to a polymer having at least about 50 wt. %, or at least about 70 wt. %, or at least about 75 wt. %, or at least about 80 wt. %, or at least about 85 wt. % or at least about 90 wt. %, or at least 95 wt. % polypropylene relative to the total weight of polymer, for example.

In some embodiments, the polypropylene may be, for instance, a propylene homopolymer, a propylene random copolymer, a propylene impact copolymer, a syndiotactic polypropylene, isotactic polypropylene or atactic polypropylene. In other embodiments, the propylene-based polymers may be a "mini-random" polypropylene. A mini-random polypropylene has less than about 1.0 wt % of the comonomer. In certain embodiments, the comonomer in the mini-random polypropylene is ethylene. The propylene based polymers may have a melting point ($T_m$) (as measured by DSC) of at least about 100° C., or from about 115° C. to about 175° C., for example. The propylene based polymers may include about 15 wt. % or less, or about 12 wt. % or less, or about 10 wt. % or less, or about 6 wt. % or less, or about 5 wt. % or less or about 4 wt. % or less of xylene soluble material (XS), for example (as measured by ASTM D5492-06). In certain embodiments, the propylene based polymers may have a molecular weight distribution ($M_w/M_n$) of from about 2 to about 50, from about 6 to about 30 or greater than or equal to 8, for example, as measured by GPC. These propylene based polymers may have a melt flow rate (MFR) (as measured by ASTM D-1238, at 190° C. and a load of 2.16 kg) of from about 0.01 dg/min to about 20 dg/min., or from about 0.01 dg/min. to about 10 dg/min., or less than 10 dg/min, for example.

In one or more embodiments, the polymers include ethylene based polymers. As used herein, the term "ethylene based" is used interchangeably with the terms "ethylene polymer" or "polyethylene" and refers to a polymer having at least about 50 wt. %, or at least about 70 wt. %, or at least about 75 wt. %, or at least about 80 wt. %, or at least about 85 wt. % or at least about 90 wt. %, or at least 95 wt. % polyethylene relative to the total weight of polymer, for example.

The ethylene based polymers may have a density (as measured by ASTM D-792) of from about 0.86 g/cc to about 0.98 g/cc, or from about 0.88 g/cc to about 0.965 g/cc, or from about 0.90 g/cc to about 0.965 g/cc or from about 0.925 g/cc to about 0.97 g/cc, for example.

The ethylene based polymers may have a melt index ($MI_2$) (as measured by ASTM D-1238, at 190° C. and a load of 2.16 kg) of from about 0.01 dg/min to about 1000 dg/min., or from about 0.01 dg/min. to about 25 dg/min., or from about 0.03 dg/min. to about 15 dg/min. or from about 0.05 dg/min. to about 10 dg/min, for example.

In one or more embodiments, the olefin based polymers include low density polyethylene. In one or more embodiments, the olefin based polymers include linear low density polyethylene. In one or more embodiments, the olefin based polymers include medium density polyethylene. As used herein, the term "medium density polyethylene" refers to ethylene based polymers having a density of from about 0.92 g/cc to about 0.94 g/cc or from about 0.926 g/cc to about 0.94 g/cc, for example, as measured by ASTM D-792.

In one or more embodiments, the olefin based polymers include high density polyethylene. As used herein, the term "high density polyethylene" refers to ethylene based polymers having a density of from about 0.94 g/cc to about 0.97 g/cc, for example, as measured by ASTM D-792.

In certain non-limiting embodiments of the present disclosure, a mixture of one or more olefin based polymers may be used.

In certain embodiments of the present disclosure, the polyolefin may be combined with one or more ionomers to form a polymer composition. The ionomer may include functionalized organometallic compounds such as an organometallic salt having acrylate functional groups, termed a "metallic acrylate salt," for example. Non-limiting examples of metallic acrylate salts are metallic diacrylates, such as zinc diacrylate, zinc dimethylacrylate, copper diacrylate, copper dimethylacrylate, and combinations thereof. Other organometallic salts include zinc di-vinylacetate, zinc di-ethylfumarate, copper di-vinylacetate, copper diethylfumarate, aluminum triacrylate, aluminum trimethylacrylate, aluminum tri-vinylacetate, aluminum tri-ethylfumarate, zirconium tetraacrylate, zirconium tetramethylacrylate, zirconium tetra-vinylacetate, zirconium tetra-ethyl fumarate, sodium acrylate, sodium methacrylate, silver methacrylate, and combinations thereof. An example of a metallic diacrylate is product Dymalink 9200 (formerly SR732) or Dymalink 9201, both of which are commercially available from Cray Valley Specialty Chemicals. Dymalink 9200 is available as a white powder having a molecular weight of about 207 g/mol. Dymalink 9201 includes the metallic diacrylate in a pellet concentrate. The polymer composition of the polymer and ionomer may include between 0.001 and 8 wt % of the ionomer, between 0.01 and 6 wt % of the ionomer, or less than or equal to 5 wt % of the ionomer.

In some embodiments of the present disclosure, an additive may be combined with the polymer composition. For example, the additive may be a peroxydicarbonate peroxide. In these embodiments, the peroxydicarbonate peroxide may have the general structure of ROC(O)O—O(O)CR$_1$ wherein R and R$_1$ represent alkyl and/or aryl groups. Non-limiting examples of peroxydicarbonate peroxides include, but are not limited to di(4-tert-butylcyclohexyl) peroxydicarbonate, dicetyl peroxydicarbonate, dimyristyl peroxydicarbonate, diisopropyl peroxydicarbonate, isopropyl sec-butyl peroxydicarbonate, di-sec-butyl peroxydicarbonate, di(2-ethylhexyl) peroxydicarbonate, and mixtures thereof. When present, the peroxydicarbonate peroxide may include between 0.001 and 3 wt % of the peroxydicarbonate peroxide, between 0.01 and 2.5 wt % of the peroxydicarbonate peroxide, or less than or equal to 2 wt % of the peroxydicarbonate peroxide.

Mixing of the ionomer with the polymer may be performed by melt mixing using medium to high intensity mixing equipment including single and twin screw extruders, Banbury mixers, or roll mill provided the metallic acrylate salt is adequately dispersed. Temperatures utilized for mixing may be 30° C. above the melting point of the polymer. In particular embodiments, the polymer/ionomer may be heated above 200° C., or between 200-260° C. In certain embodiments of the present disclosure, such as when a peroxydicarbonate peroxide is used, the ionomer may be formed in situ, i.e., may be formed during the melt mixing process. For instance, in one embodiment, the ionomer may be formed by mixing zinc oxide with acrylic acid while mixing with the polymer.

In other embodiments, the additive may be a polar polymer, including, but not limited to polylactic acid, polycaprolactone, polyethylene glycol, or mixtures thereof. In these embodiments, the polar polymer may be present in amounts of between 0.001 and 3 wt % of the polymer composition, between 0.01 and 2.5 wt % of the polymer composition, or less than or equal to 2 wt % of the polymer composition. In some embodiments, both the peroxydicarbonate peroxide and the polar polymer may be present in the polymer composition.

In still other embodiments, the additive may be a non-polar polymer, such as a polyolefin different from that of the polymer composition. Examples include, but are not limited to, polypropylene and polyethylene. The non-polar polymer may be physically blended or chemically mixed with the polymer of the polymer composition, i.e., the non-polar polymer may be manufactured in conjunction with the polymer of the polymer composition during formation of the polymer of the polymer composition in one or more reactors, or the non-polar polymer may be physically blended, such as by single and twin screw extruders, Banbury mixers, or roll mills.

In certain embodiments of the present disclosure, the olefin based polymer may be mixed with a polar polymer such as polylactic acid, polycaprolactone, polyethylene glycol, or mixtures thereof in the absence of an ionomer to form a polymer composition. In these embodiments, the polar polymer may be present in amounts of between 0.001 and 3 wt % of the polymer composition, between 0.01 and 2.5 wt % of the polymer composition, or less than or equal to 2 wt % of the polymer composition.

The polymer composition may contain additives such as antioxidants, light stabilizers, acid scavengers, lubricants, antistatic additives, nucleating/clarifying agents, colorants, or combinations thereof. In an embodiment, the additives are present in a quantity from 0.01 to 5 wt %, optionally from 0.1 to 3 wt %, optionally from 0.5 to 2 wt %, in relation to the weight of the polymer composition. In some embodiments, the polymer composition may be pelletized.

In some embodiments of the present disclosure, the melt flow rate of the polymer composition may be from 0.1 g/10 min to 10 g/10 min or between 1 g/10 min to 3.5 g/10 min or between 1.5 g/10 min and 3 g/10 min as measured by ASTM D-1238, at 190° C. and a load of 2.16 kg. In certain embodiments of the present disclosure, the melt flow viscosity of the polymer composition may be between 2,000 Pa·s and 6,000 Pa·s or between 2,700 Pa·s and 5,200 Pa·s as measured by ASTM D-1238, at 190° C. and a load of 2.16 kg. The die swell of the polymer composition may be between 2 and 8, or between 3 and 5 as measured by ASTM D-3835. The die swell characteristic time may be from 0.3 seconds and 1.2 seconds or between 0.4 and 1.1 seconds. In one or more embodiments, the polymer composition may be characterized by one or more of the following properties: a melt flow rate of from 0.1 g/10 min to 10 g/10 min or between 1 g/10 min to 3.5 g/10 min or between 1.5 g/10 min and 3 g/10 min as measured by ASTM D-1238, at 190° C. and a load of 2.16 kg; a melt flow viscosity of between 2,000 Pa·s and 6,000 Pa·s or between 2,700 Pa·s and 5,200 Pa·s as measured by ASTM D-1238, at 190° C. and a load of 2.16 kg; a die swell of between 2 and 8, or between 3 and 5 as measured by ASTM D-3835; and a die swell characteristic time of from 0.3 seconds to 1.2 seconds or between 0.4 and 1.1 seconds.

Product Application

The polymer compositions blends are useful in the manufacture of polymer foamed sheets or foamed polymer layers in films (collectively referred to as "polymer foams" hereinafter). The polymer foam may be prepared from polymer composition and a foaming agent. In certain embodiments, prior to foaming, the pelletized or unpelletized polymer composition may be combined with additives, such as antioxidants, light stabilizers, acid scavengers, lubricants, antistatic additives, nucleating/clarifying agents, colorants, or combinations thereof. The polymer composition may be of the type described previously herein. The foaming agent may be any foaming agent compatible with the other components of the polymer composition such as for example physical blowing agents, chemical blowing agents, and the like. Physical foaming agents are typically nonflammable gases that are able to evacuate the composition quickly leaving voids in the composition. Chemical foaming agents are chemical compounds that decompose endothermically at elevated temperatures. Decomposition of the chemical foaming agents generates gases that become entrained in the polymer composition, thus leading to the formation of voids within the polymer composition. Non-limiting examples of foaming agents suitable for use in this disclosure include without limitation pentane, isopentane carbon dioxide, nitrogen, water vapor, propane, n-butane, isobutane, n-pentane, 2,3-dimethylpropane, 1-pentene, cyclopentene, n-hexane, 2-methylpentane, 3-methylpentane, 2,3-dimethylbutane, 1-hexene, cyclohexane, n-heptane, 2-methylhexane, 2,2-dimethylpentane, 2,3-dimethylpentane, and combinations thereof.

In an embodiment, the foamed polymer composition is prepared by contacting the polymer composition with the foaming agent, and thoroughly mixing the components for example by compounding or extrusion. In an embodiment, the polymer composition is plasticized or melted by heating in an extruder and is contacted and mixed thoroughly with the foaming agent. Alternatively, the polymer may be contacted with the foaming agent prior to introduction of the mixture to the extruder (e.g., via bulk mixing), during the introduction of the polymer composition to an extruder, or combinations thereof.

Examples of additives and foam manufacturing methods may be found in PCT/US2012/043018, filed Jun. 18, 2012 by Berry Plastics Corporation, which is fully incorporated herein by reference.

In certain embodiments of the present disclosure, the polymer foam sheet has a flexural modulus of between $1.0\times10^4$ and $5.0\times10^4$ psi, $1.5\times10^4$ and $3.5\times10^4$ psi, or between $2.0\times10^4$ and $3.0\times10^4$ psi as measured by ASTM-D-790. In some embodiments of the present disclosure, the flexural strength of the polymer foam sheet is between 500 and 1400 psi, between 600 and 1100 psi, or between 700 and 1000 psi, as measured by ASTM-D-790. In certain embodiments, the polymer foam sheet has an open cell content of less than 80%, less than 50%, or less than 30%. In certain embodiments, cells in the polymer foam that are not open are closed cells. In some embodiments, the density of the polymer foam sheet is less than 0.50 g/cc, less than 0.25 g/cc or less than 0.20 g/cc. In certain embodiments, the polymer foam sheet has a density of between 0.15 and 0.20 and an open cell content of between 30% and 40%.

EXAMPLES

Example 1

Polypropylene Foams and Corresponding Density and Open Cell Content

A polypropylene homopolymer with an MWD of 6 was foamed. Three polypropylene compositions were formed using a polypropylene homopolymer; the melt flow ratios, MWD, metallic acrylate salt composition, and additives of the polypropylene composition are listed in Table 1. The three polypropylene compositions were then foamed with $CO_2$. The corresponding densities and open cell content percentages were measured and are listed in Table 2.

TABLE 1

| Sample | MFR | MWD | Metallic acrylate salt | Additive |
|---|---|---|---|---|
| PP Composition 1 | 4.0 dg/min | 8.0 | 2% | 2% polylactic acid |
| PP Composition 2 | 8 dg/min | 13 | 2% | None |
| PP Composition 3 | 8 dg/min | 13 | 2% | 0.5% peroxydicarbonate |

MFR was measured using ASTM-D-1238, at 190° C. and a load of 2.16 kg. MWD was measured using GPC. Metallic acrylate salt and additive composition percentages are by weight.

TABLE 2

| Material | Density (g/cc) | Open Cell Content (%) |
|---|---|---|
| PP Homopolymer (MWD = 6) | 0.6 | 80 |
| PP Composition 1 | 0.09 | 48 |
| PP Composition 2 | 0.18 | 32 |
| PP Composition 3 | 0.23 | 27 |

Example 2

Melt flow rates, melt flow viscosities, die swell, and die swell characteristic times were measured for commercially available non-branched polypropylene resins (Total PP 3354, Total PP 3462, Total miPP M3282MZ, Total PP 3276, Total PP 3281, Total Finaplas® 1471, and Total Finaplas® 1251). Melt flow rates, melt flow viscosities, die swell, and die swell characteristic times were also measured for commercially available branched polypropylene resins (Borealis Daploy™ WB140HMS and Montell Pro-fax PF814). Six polypropylene compositions were formed using a polypropylene homopolymer; melt flow rates, melt flow viscosities, die swell, and die swell characteristic times, and components of the polypropylene composition are listed in Table 3. Perkadox 24L is dicetyl peroxydicarbonate manufactured by Akzo Nobel. Total PP 3354, Total PP 3462, Total miPP M3282MZ, Total PP 3276, Total PP 3281, Total Finaplas® 1471, and Total Finaplas® 1251 are polypropylene homopolymers manufactured by Total Petrochemicals. SR351 is 2,2-bis (prop-2-enoyloxymethyl)butyl prop-2-enoate manufactured by BASF.

TABLE 3

| Sample Name | Melt Flow Rate [g/10 min] | Melt Flow Viscosity [Pa · s] | Die Swell [ ] | Die Swell Characteristic Time [sec] |
|---|---|---|---|---|
| Standard PP Resins | | | | |
| Total PP 3354 | 4.4 | 1,798 | 1.9 | 0.12 |
| Total PP 3462 | 3.9 | 1,998 | 1.2 | 0.13 |
| Total miPP M3282MZ | 2.7 | 2,949 | 1.0 | 0.15 |
| Total PP 3276 | 2.4 | 3,311 | 1.5 | 0.24 |
| Total PP 3281 | 1.3 | 6,287 | 1.5 | 0.44 |
| Total Finaplas® 1471 | 7.1 | 1,922 | 1.0 | 0.10 |
| Total Finaplas® 1251 | 2.1 | 3,686 | 1.3 | 0.23 |
| Modified PP based Resins | | | | |
| Borealis Daploy™ WB140HMS | 2.3 | 3,484 | 6.5 | 1.15 |
| Montell Pro-fax PF814 | 2.9 | 2,756 | 5.4 | 0.73 |
| Total PP 3354 + 0.5% Dymalink 9200 | 2.8 | 2,780 | 3.1 | 0.42 |
| Total PP 3354 + 1.0% Dymalink 9200 | 1.6 | 5,065 | 3.6 | 0.92 |
| Total PP 3354 + 2.0% Dymalink 9200 | 1.5 | 5,154 | 4.4 | 1.04 |
| Total PP 3354 + 1.5% Perkadox 24L | 3.7 | 2,137 | 3.0 | 0.33 |
| Total PP 3276 + 1% SR351 | 2.2 | 3,509 | 4.6 | 0.78 |
| Total PP 3354 + 2% Dymalink 9200 + 2% PLA | 2.1 | 3,786 | 3.0 | 0.55 |

Melt flow rate was measured using ASTM D-1238, at 190° C. and a load of 2.16 kg. Melt flow viscosity was measured using ASTM D-1238, at 190° C. and a load of 2.16 kg. The die swell of the polymer composition was measured using ASTM D-3835. Percentages of components in the polymer compositions are by weight.

Example 3

Flexural Properties of Polypropylene Foams

The flexural properties of foams made from a commercial polypropylene foam resin and PP Composition 2 were measured and are tabulated in Table 4.

TABLE 4

| Description | Commercial PP foam resin | PP Composition 2 |
|---|---|---|
| Flexural Modulus, psi | $1.42 \times 10^4$ | $2.46 \times 10^4$ |
| Flexural Strength, psi | 547 | 829 |

Flexural modulus and flexural strength are measured using ASTM-D-790.

Example 4

The resins and polymer compositions from Example listed in Table 5 were made into foams using $CO_2$ as a blowing agent. Foam densities of the foams are also listed in Table 5.

TABLE 5

| Material | Density [g/cc] |
|---|---|
| Borealis Daploy™ WB140HMS | 0.2402 |
| Total PP 3354 | 0.5245 |
| Total PP 3354 + 1.5% Dymalink 9200 | 0.2464 |
| Total PP 3354 + 1% PLA | 0.2125 |
| Total PP 3354 + 2% PLA | 0.2010 |

TABLE 5-continued

| Material | Density [g/cc] |
|---|---|
| Total PP 3354 + 2% Dymalink 9200 + 2% PLA | 0.1790 |
| Total PP 3354 + 2% Dymalink 9200 + 2% PLA + 0.05% Joncryl MB | 0.1807 |

Depending on the context, all references herein to the "disclosure" may in some cases refer to certain specific embodiments only. In other cases it may refer to subject matter recited in one or more, but not necessarily all, of the claims. While the foregoing is directed to embodiments, versions and examples of the present disclosure, which are included to enable a person of ordinary skill in the art to make and use the disclosures when the information in this patent is combined with available information and technology, the disclosures are not limited to only these particular embodiments, versions and examples. Other and further embodiments, versions and examples of the disclosure may be devised without departing from the basic scope thereof and the scope thereof is determined by the claims that follow.

What is claimed is:

1. A polymer foam comprising:
    a polymer composition comprising at least 50 wt % of a polypropylene polymer having a molecular weight distribution of greater than or equal to 8 as measured by GPC; and
    a metallic acrylate salt;
    wherein the polymer composition is characterized by one or more of the following properties:
        a melt flow rate of from 0.1 g/10 min to 10 g/10 min as measured by ASTM D-1238;
        a melt flow viscosity between 2,000 Pa·s and 6,000 Pa·s as measured by ASTM D-1238;
        a die swell of between 2 and 8 as measured by ASTM D-3835; and
        a die swell characteristic time of between 0.3 seconds and 1.2 seconds,
    and wherein the polymer foam comprises a density of less than 0.50 g/cc and an open cell content of less than 80%.

2. The polymer foam of claim 1, wherein the polypropylene has a melt flow rate of less than 10 dg/min, as measured by ASTM-D-1238.

3. The polymer foam of claim 1, further comprising a non-polar polymer.

4. The polymer foam of claim 1, wherein the metallic acrylate salt is present in the polymer composition in an amount of between 0.01 and 6 wt %.

5. The polymer foam of claim 1, wherein the metallic acrylate salt is metallic diacrylate.

6. The polymer foam of claim 1, wherein the metallic acrylate salt is zinc diacrylate, zinc dimethylacrylate, copper diacrylate, copper dimethylacrylate, zinc di-vinylacetate, zinc di-ethylfumarate, copper di-vinylacetate, copper diethyl fumarate, aluminum triacrylate, aluminum trimethylacrylate, aluminum tri-vinylacetate, aluminum tri-ethylfumarate, zirconium tetraacrylate, zirconium tetramethylacrylate, zirconium tetra-vinylacetate, zirconium tetra-ethyl fumarate, sodium acrylate, sodium methacrylate, silver methacrylate, or combinations thereof.

7. The polymer foam of claim 1, wherein the polymer composition further comprises a peroxydicarbonate peroxide.

8. The polymer foam of claim 7, wherein the peroxydicarbonate peroxide is di(4-tert-butylcyclohexyl) peroxydicarbonate, dicetyl peroxydicarbonate, dimyristyl peroxydicarbonate, diisopropyl peroxydicarbonate, isopropyl sec-butyl peroxydicarbonate, di-sec-butyl peroxydicarbonate, di(2-ethylhexyl) peroxydicarbonate, or a mixture thereof.

9. The polymer foam of claim 7, wherein the peroxydicarbonate peroxide is present in the polymer composition in an amount of between 0.01 and 2.5 wt %.

10. The polymer foam of claim 1, wherein the polymer composition further comprises a polar polymer.

11. The polymer foam of claim 10, wherein the polar polymer is polylactic acid, polycaprolactone, polyethylene glycol, or a mixture thereof.

12. The polymer foam of claim 10, wherein the polar polymer is present in the polymer composition in an amount between 0.01 and 2.5 wt %.

13. The polymer foam of claim 1, wherein the polymer composition has a melt flow rate of from 0.1 g/10 min to 10 g/10 min as measured by ASTM D-1238.

14. The polymer foam of claim 1, wherein the polymer composition has a melt flow viscosity between 2,000 Pa·s and 6,000 Pa·s as measured by ASTM D-1238.

15. The polymer foam of claim 1, wherein the polymer composition has a die swell of between 2 and 8 as measured by ASTM D-3835.

16. The polymer foam of claim 1, wherein the polymer composition has a die swell characteristic time of between 0.3 seconds and 1.2 seconds.

17. The foam of claim 1, wherein the foam has a flexural modulus of between $1.5 \times 10^4$ and $3.5 \times 10^4$ psi as measured by ASTM-D-790.

18. The foam of claim 1, wherein the polyolefin foam has a flexural strength of between 600 and 1100 psi as measured by ASTM-D-790.

19. The foam of claim 1, wherein the density of the foam is less than 0.50 g/cc.

20. The foam of claim 19, wherein the density of the foam is less than 0.20 g/cc.

21. A process comprising:
    supplying a polymer composition comprising a metallic acrylate salt and at least 50 wt % of a polypropylene resin having a molecular weight distribution of greater than or equal to 8 as measured by GPC; and
    mixing the polymer composition and a foaming agent to form a polymer foam;
    wherein the polymer composition is characterized by one or more of the following properties:
        a melt flow rate of from 0.1 g/10 min to 10 g/10 min as measured by ASTM D-1238;
        a melt flow viscosity between 2,000 Pa·s and 6,000 Pa·s as measured by ASTM D-1238;
        a die swell of between 2 and 8 as measured by ASTM D-3835; and
        a die swell characteristic time of between 0.3 seconds and 1.2 seconds.

22. The process of claim 21, wherein the foaming agent is pentane, isopentane carbon dioxide, nitrogen, water vapor, propane, n-butane, isobutane, n-pentane, 2,3-dimethylpropane, 1-pentene, cyclopentene, n-hexane, 2-methylpentane, 3-methylpentane, 2,3-dimethylbutane, 1-hexene, cyclohexane, n-heptane, 2-methylhexane, 2,2-dimethylpentane, 2,3-dimethylpentane, or combinations thereof.

23. A foam comprising:
    a polymer composition comprising a polyolefin, a metallic acrylate salt, and a polar polymer, wherein the polar polymer is between 0.001% and 3% of the polymer composition by weight, wherein the polymer composition does not include an ionomer, and wherein the foam has foam density of less than 0.25 g/cc, wherein the polymer composition is characterized by one or more of the following properties:
a melt flow rate of from 0.1 g/10 min to 10 g/10 min as measured by ASTM D-1238;
a melt flow viscosity between 2,000 Pa·s and 6,000 Pa·s as measured by ASTM D-1238;
a die swell of between 2 and 8 as measured by ASTM D-3835, and
wherein the polymer foam comprises a density of less than 0.50 g/cc and an open cell content of less than 80%.

* * * * *